United States Patent [19]
Lee et al.

[11] Patent Number: 5,880,915
[45] Date of Patent: Mar. 9, 1999

[54] CRACK RESISTANT MAGNETIC WRITE HEAD

[75] Inventors: Edward Hinpong Lee, San Jose; Peter Beverley Powell Phipps, Saratoga, both of Calif.

[73] Assignee: International Business Machines Corporation, Armonk, N.Y.

[21] Appl. No.: 731,816

[22] Filed: Oct. 21, 1996

[51] Int. Cl.$^6$ .............................. G11B 5/147; G11B 5/23
[52] U.S. Cl. .......................... 360/126; 360/119; 360/113
[58] Field of Search .................................... 360/113, 119, 360/122, 123, 125, 126, 110; 29/603.07, 603.13, 603.14, 603.15, 603.23, 603.24, 603.25

[56] References Cited

U.S. PATENT DOCUMENTS

| | | | |
|---|---|---|---|
| 5,198,949 | 3/1993 | Narisawa et al. | 360/119 |
| 5,559,654 | 9/1996 | Das | 360/126 |
| 5,621,596 | 4/1997 | Santini | 360/126 |
| 5,706,152 | 1/1998 | Hanjo et al. | 360/126 |

FOREIGN PATENT DOCUMENTS

| | | |
|---|---|---|
| 62-273616 | 11/1987 | Japan . |
| 03-037809 | 2/1991 | Japan . |
| 05-135330 | 6/1993 | Japan . |

OTHER PUBLICATIONS

A. S. Chekanove et al., "Microcracks of the Alumina of the Thin–Film Head: Study and Simulation", IEEE Transactions on Magnetics, vol. 31, No. 6, Nov. 1995, pp. 2991–2993.

J. M. Harker et al. "A Quarter Century of Disk File Innovation", IBM J. Res. Develop., vol. 25, No. 5, Sep. 1981, pp. 677–689.

Primary Examiner—Stuart S. Levy
Assistant Examiner—David L. Ometz
Attorney, Agent, or Firm—Gray Cary Ware Freidenrich

[57] ABSTRACT

The reconfiguration of a magnetic write head minimizes cracking at the ABS. This is accomplished by selectively reconfiguring the front edge of the insulation layer that defines the zero throat height (ZTH) so as to increase the volume of the overcoat layer which interfaces with the reconfigured edge. The front edge of the ZTH-defining insulation layer has a central portion which is centered with respect to the second pole tip and first and second lateral portions which are on each side of the front portion and parallel to the ABS. The front edge portion is recessed from the ABS a distance appropriate for defining the ZTH between the first and second pole pieces of the write head. The first and second lateral edges are further recessed into the head so as to increase the volume of the overcoat layer between the ABS and the first and second lateral edges. The increased volume of the overcoat layer better absorbs stresses and strains due to shock loading and temperature so as to reduce cracking of the head at the ABS.

20 Claims, 7 Drawing Sheets

CRACK RESISTANT MAGNETIC WRITE HEAD

BACKGROUND OF THE INVENTION

1. Field of the Invention

The present invention relates to a crack resistant magnetic write head and more particularly to a write head with an enlarged overcoat layer portion adjacent an air bearing surface (ABS) for absorbing stress arising from impacts and heat.

2. Description of the Related Art

A typical magnetic write head has one or more coil layers embedded in an insulation stack that is sandwiched between first and second pole pieces. The first and second pole pieces are magnetically connected and have first and second pole tips separated by a magnetically insulative gap layer to form a gap at an air bearing surface (ABS). The coil layer induces a magnetic field in the pole pieces which fringes across the gap. The magnetic write head is covered with an overcoat layer for protection of the aforementioned components.

A combined head, such as a merged magnetoresistive (MR) head, includes the aforementioned write head as a write head portion combined with an MR read head portion. The combined head is carried on a slider that is mounted on a suspension in a magnetic disk drive. The suspension is mounted to an actuator which moves the combined head over selected tracks on a rotating disk for reading and writing signals thereon. As the disk rotates, a cushion of air provides an air bearing between the disk and the slider which counterbalances the loading force exerted by the suspension. The ABS, the surface of the slider facing the disk, is typically spaced about 0.075 $\mu$m from the disk when the disk rotates. When the rotation commences, the slider takes off from the disk and rides on the cushion of air. When the disk stops, the slider lands on the disk. This is referred to in the art as contact start and stop (CSS) operation. Friction and heat are developed by both events.

In the fabrication of a thin film magnetic write head it is important that zero throat height (ZTH) be accurately located. The ZTH is the point after the ABS where the first and second pole pieces separate from one another. This separation is caused by a central recessed edge of the insulation stack which elevates the second pole piece above the first pole piece. It is desirable to locate the ZTH as near the ABS as possible in order to minimize flux leakage between the pole pieces. The insulation stack typically includes a first insulation layer (I1) on the first pole piece layer, one or more coil layers on the first insulation layer, a second insulation layer (I2) over the coil layer and a third insulation layer (I3) over the second insulation layer. One of these insulation layers, typically the first insulation layer, has a forward central edge which extends laterally and parallel to the ABS and defines the ZTH. This central edge is typically located about 1–2 $\mu$m from the ABS.

A portion of the ABS is formed by front edges of the thin film components of the write head. These edges comprise the front edge of the gap layer and the front edges of the first and second pole tips. An ABS view of the write head shows a small gap layer end disposed between a wide first pole tip end and a narrow second pole tip end. The second pole tip end appears as a pedestal with first and second side walls that are parallel to one another and perpendicular to the ABS. The second pole tip is the trailing pole tip with respect to a rotating disk. Accordingly, the lateral width between the side walls of the second pole tip defines the track width of the write head. Surrounding the edges and forming a portion of the ABS is a front edge of the overcoat layer. The overcoat layer has a wide lateral expanse in both directions from the first and second walls of the second pole tip. The overcoat layer also extends rearwardly toward the back gap, interfacing with the central edge of the ZTH-defining insulation layer, which typically is the first insulation layer. This interface extends parallel to the ABS along substantially the full lateral width of the front edge of the ZTH-defining insulation layer. Since the edge of the ZTH-defining insulation layer is recessed only 1–2 $\mu$m from the ABS, there is an extremely small volume of the overcoat layer between the ABS and the edge of the ZTH-defining insulation layer.

A magnetic write head is a lamination of many components. Unfortunately, these components are fabricated from different materials with different thermal coefficients of expansion and different moduli of elasticity. Typically, the insulation stack is photoresist, the overcoat layer and the gap layer are alumina ($Al_2O_3$), the pole pieces are Permalloy ($Ni_{79}Fe_{21}$), and the coil layer is copper. The modulus of elasticity of the photoresist is 7, as compared to 100 for alumina and 200 for Permalloy. Therefore, relative to the overcoat layer and the pole pieces, the insulation stack is very compliant. Further, the coefficient of thermal expansion of photoresist is 36 E-6/degree C., whereas the thermal expansion of the overcoat layer is 6 E-6/degree C. Accordingly, the insulation stack expands 6 times as much as the overcoat layer.

The write head is a delicate structure which, unfortunately, is subjected to impact shock during fabrication, during assembly in a disk drive, during shipment and during use. Further, the head is subjected to expansive stress due to heating of the coil. During contact start and stop, the ABS end of the head is subjected to both heat and impact loading. The head components are stressed and strained by these conditions. The weakest region of the head is the small volume of the overcoat layer between the ABS and the front edge of the ZTH-defining insulation layer. An alumina overcoat layer absorbs stress well, especially since its modulus of elasticity is reasonably close to that of the Permalloy pole tips. Unfortunately, the extent of the alumina overcoat layer between the ABS and the front edge of the ZTH-defining insulation layer is minimal. Impact loading at the ABS quickly affects the insulation stack, which responds like jelly as compared to the other layers. Further, when heated, the insulation stack expands more than the overcoat layer, causing additional stresses and strains at all interfaces with the insulation stack. It would be desirable to increase the depth of the overcoat layer from the ABS into the head, but this is not practical because the magnetics of the head would be adversely affected by an increase in the ZTH.

Because of the structure and the materials employed, the write head develops cracks at the ABS. The weakest point at the ABS is the inside corners of the second pole tip. Cracks typically radiate from these corners and migrate laterally or radiate at some lateral location and migrate toward these corners. With repeated stress, these cracks grow. This phenomenon and resultant degradation of head performance is reported in IEEE Transactions on Magnetics, Vol. 31, No. 6, November 1995, page 2991 by Chekanov et al.

SUMMARY OF THE INVENTION

The present invention provides an increase in the volume of the overcoat layer adjacent the ABS without increasing the ZTH. This is accomplished by recessing first and second portions of the laterally extending edge of the ZTH-defining insulation layer on each side of the second pole tip, leaving a central edge of the insulation layer intact for defining the ZTH. In a plan view of the thin film surfaces of the head, the ZTH-defining insulation layer has a pair of recessed shoulders with a forwardly projecting neck, the neck providing the central edge which defines the ZTH. The central edge is maintained at 1–2 μm from the ABS, to define the ZTH, as taught by the prior art, while the lateral edges, which define the shoulders, are recessed from the ABS, on the order of 5–6 μm, since they are not needed to define the ZTH. This allows the alumina of the overcoat layer to fill in the space given up by the lateral edges so as to provide an additional volume of the overcoat layer adjacent the ABS for absorbing stresses and strains from shock loading and heat. Experiments have been conducted to show that write heads having ZTH-defining insulation layers with recessed first and second lateral edges on each side of a central edge which defines the ZTH develop significantly less cracks than write heads that do not have the recessed first and second lateral edges.

A limitation on the amount that the first and second lateral edges of the ZTH-defining insulation layer can be recessed is the location of the front edge of the coil layer. The coil is located as close as possible to the ABS to minimize magnetic saturation of the thin second pole tip. The front edge of the coil is typically parallel to the ABS for 60–100 μm. Accordingly, the first and second lateral edges of the insulation layer are preferably recessed throughout the lateral expanse of the front edge of the coil on each side of the central edge of the insulation layer thereby optimizing the volume of the overcoat layer adjacent the ABS.

An object of the present invention is to minimize cracking at the ABS of a magnetic write head.

Another object is to increase the volume of the overcoat layer near the ABS without increasing the ZTH of a magnetic write head.

A further object is to configure a front edge of a ZTH-defining insulation layer so that a central portion of the front edge defines the ZTH and first and second lateral portions on each side of the central portion are recessed from the central portion.

Other objects and attendant advantages of the present invention will become apparent upon reading the following description taken together with the accompanying drawings.

DESCRIPTION OF THE PREFERRED EMBODIMENT

Figure 1:
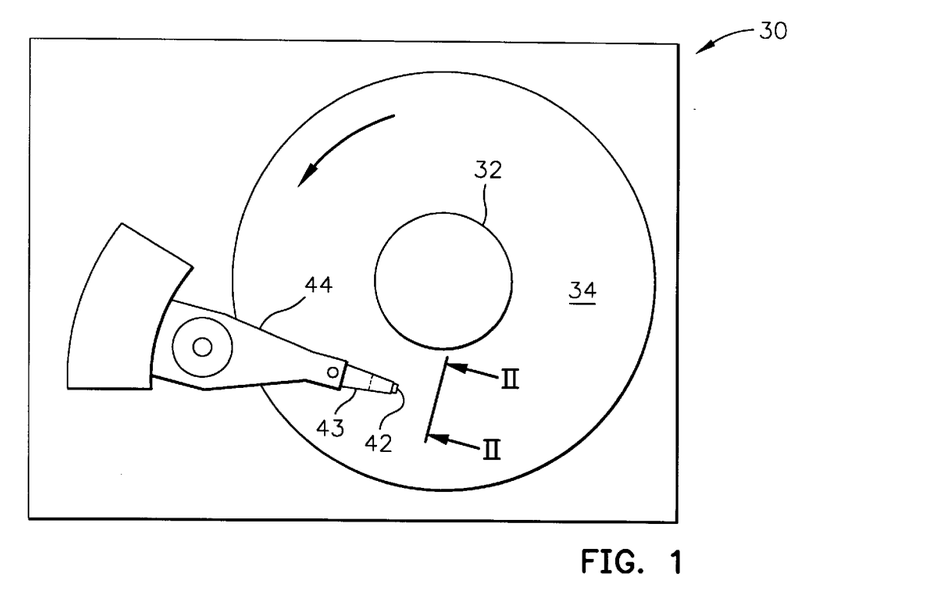
FIG. 1 is plan view of a magnetic disk drive.
Figure 2:
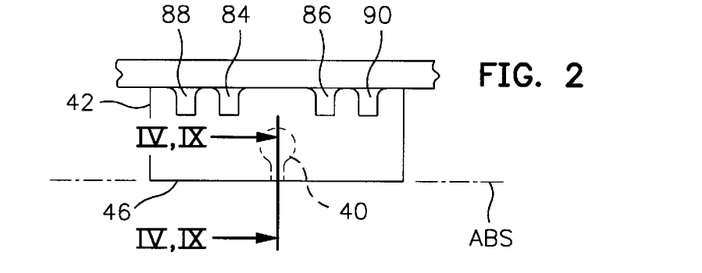
FIG. 2 is a view taken perpendicular to the plane II—II of FIG. 1.
Figure 3:
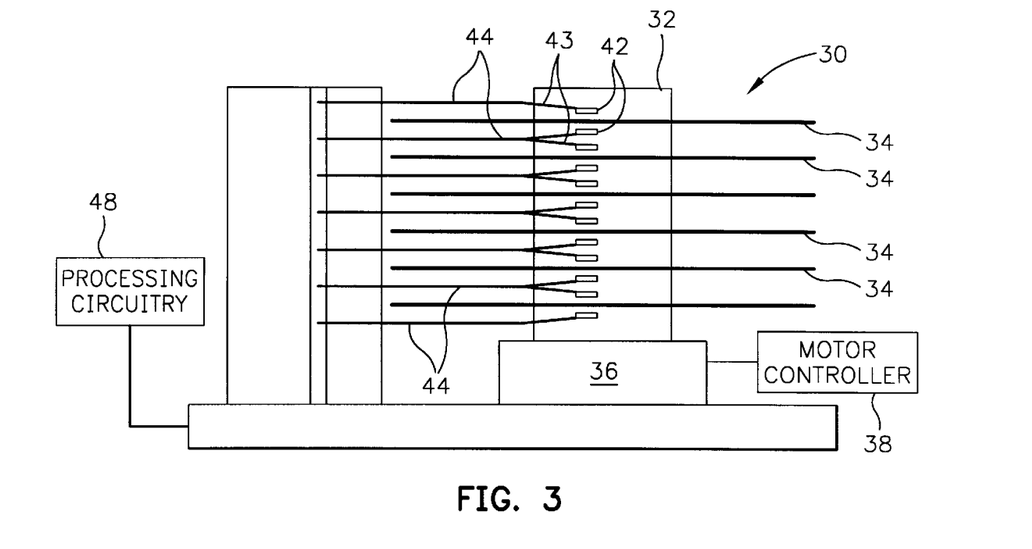
FIG. 3 is a side view of the magnetic disk drive of FIG. 1.

A Referring now to the drawings wherein like reference numerals designate like or similar parts throughout the several views there is illustrated in FIGS. 1, 2 and 3 a magnetic disk drive 30. The drive 30 includes a spindle 32 which supports and rotates a magnetic disk 34. The spindle 32 is rotated by a motor 36 which, in turn, is controlled by a motor controller 38. A magnetic head 40, which may be a merged MR head for recording and reading, is mounted on a slider 42 supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36, the slider is supported on a thin (typically, 0.075 μm) cushion of air (air bearing) by an air bearing surface (ABS) 46 of the slider and the magnetic head. The magnetic head 40 is then employed for writing information to multiple circular tracks on the surface of the disk as well as for reading information therefrom. Processing circuitry 48 exchanges signals representing said information with the head 40, providing motor drive signals, and providing control signals for moving the slider 42 to various tracks.

Figure 4:
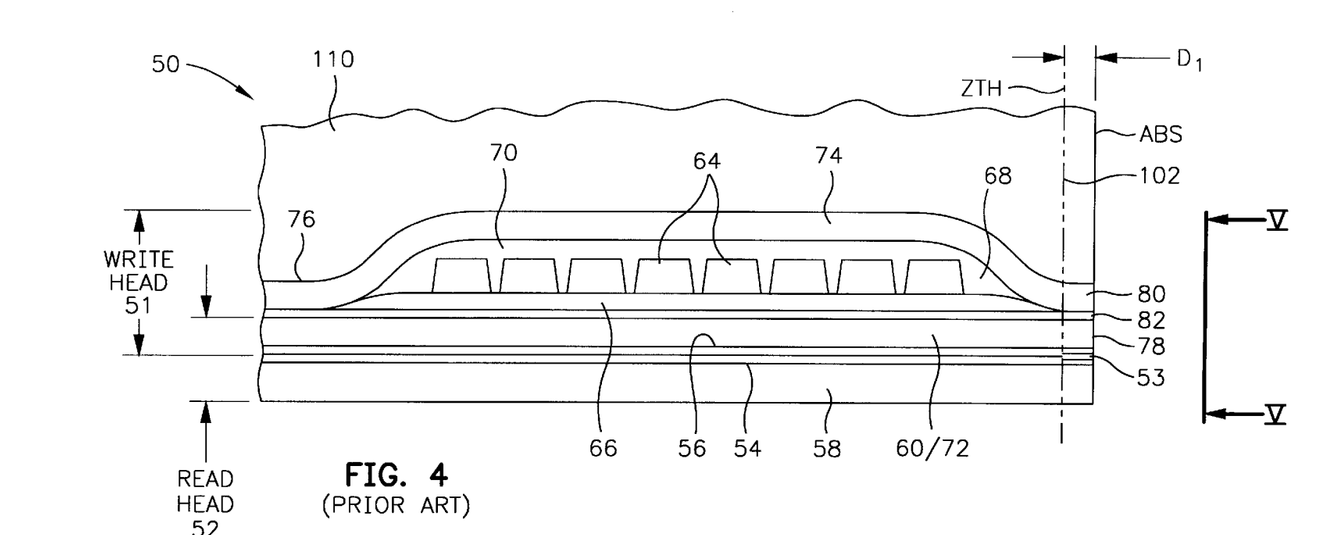
FIG. 4 is a view taken perpendicular to the plane IV—IV of FIG. 2 showing front portions of a write head portion and a read head portion of a prior art head with an overcoat layer in place.

FIG. 4 is a side cross-sectional elevation view of a prior art merged magnetoresistive (MR) head 50 which has a write head portion 51 and a read head portion 52, the read head portion employing an MR sensor 53. The MR sensor 53 is sandwiched between first and second gap layers 54 and 56 and the gap layers are sandwiched between first and second shield layers 58 and 60. In response to external magnetic fields, the resistance of the MR sensor 53 changes. A sense current conducted through the sensor causes these resistance changes to be manifested as potential changes. These potential changes are then processed by the processing circuitry 48 shown in FIG. 3.

The write head portion of the prior art head includes a coil layer 64 which is sandwiched between first and second insulation layers 66 and 68. A third insulation layer 70 may be employed for planarizing the head to eliminate ripples in the second insulation layer caused by the coil layer 64. The first, second and third insulation layers are referred to in the art as an "insulation stack". The coil layer 64, and the first, second and third insulation layers 66, 68 and 70 are sandwiched between first and second pole piece layers 72 and 74. The first and second pole piece layers 72 and 74 are magnetically coupled at a back gap 76 and have first and second pole tips 78 and 80 which are separated by a gap layer 82 at the ABS. As shown in FIG. 2 first and second solder connections 84 and 86 connect leads (not shown) from the MR sensor 52 to leads (not shown) on the suspension 43 and third and fourth solder connections 88 and 90 connect leads 92 and 94 from the coil 64 (see FIG. 6) to leads (not shown) on the suspension.

Figure 6:
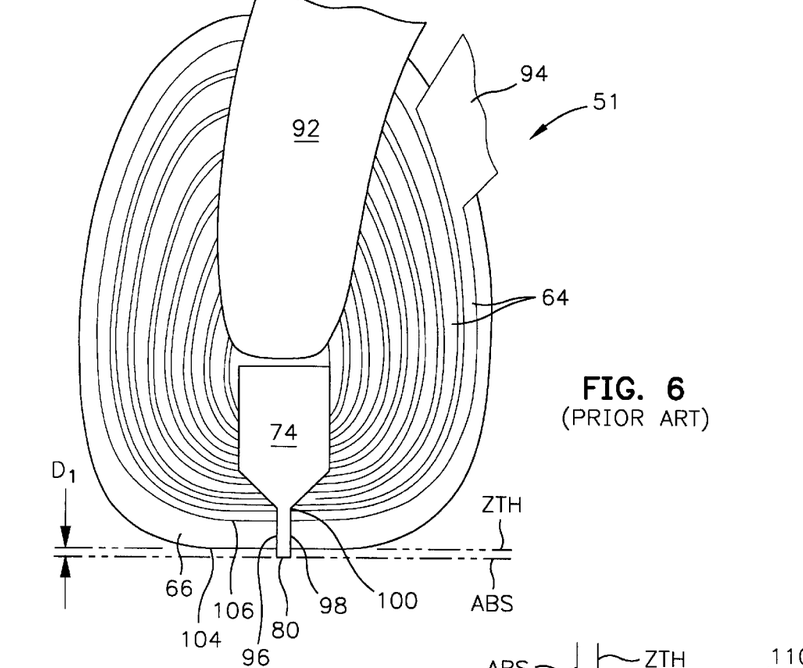
FIG. 6 is a plan view of the write head portion of the prior art head of FIG. 4 with the overcoat layer removed.

The second pole tip 80 of the write head in FIG. 6 has first and second side walls 96 and 98 which are parallel with respect to one another and perpendicular to the ABS. The second pole piece 74 has a flare point 100 which is where the pole piece 74 flares out and forms a yoke portion of the pole piece. The coil 64 is located as close as practical to the ABS so as to minimize saturation of the second pole tip 80. The insulation stack, which comprises first, second and third insulation layers 66, 68 and 70, as shown in FIG. 4, is also located as close as practical to the ABS. The insulation stack defines a zero throat height (ZTH), as shown at 102 in FIG. 4 and at 104 in FIG. 6. The ZTH is the location of the first separation of the first and second pole pieces 72 and 74 after the ABS. A short ZTH will minimize flux leakage between the first and second pole pieces. The first insulation layer 66 typically has a laterally-extending front edge 104, as seen in FIG. 6, which defines the ZTH between the first and second pole pieces. The edge 104 is typically flat so as to correspond with a front flat edge 106 of a front coil of the coil layer 64. It should be understood that while the first insulation layer is typically the ZTH-defining layer in some embodiments, the second or the third insulation layer may be the ZTH-defining layer.

Figure 5:
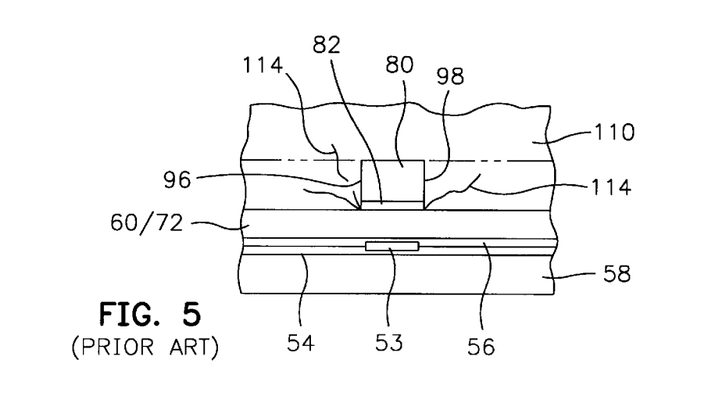
FIG. 5 is an ABS view of the prior art head taken perpendicular to the plane V—V of FIG. 4.
Figure 7:
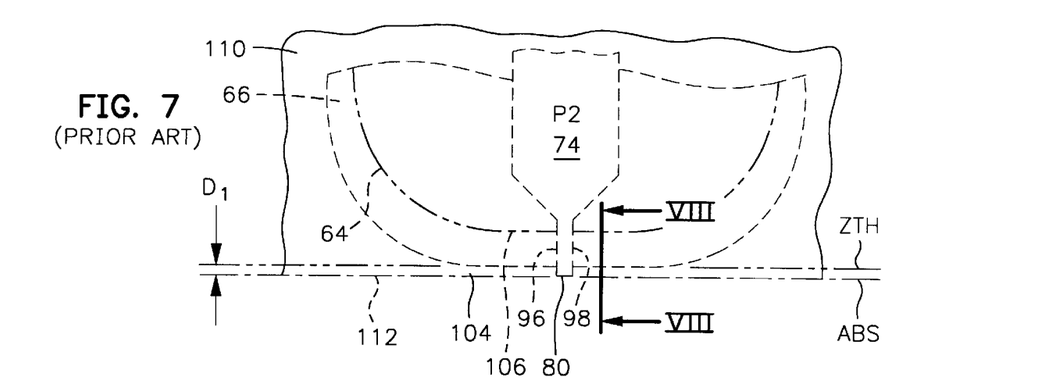
FIG. 7 is an enlarged front portion of the prior art write head of FIG. 6 with a front portion of one of the coil layers, the insulation stack and the second pole piece shown in hidden lines under an overcoat layer.
Figure 8:
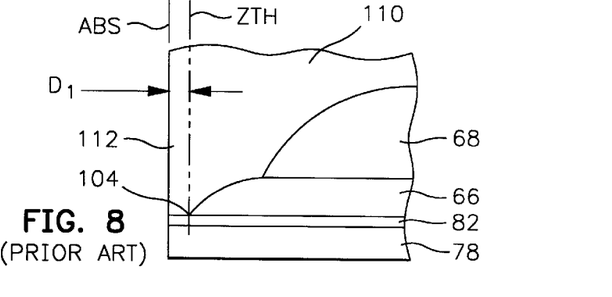
FIG. 8 is a view taken perpendicular to the plane VIII—VIII of FIG. 7.
Figure 9:
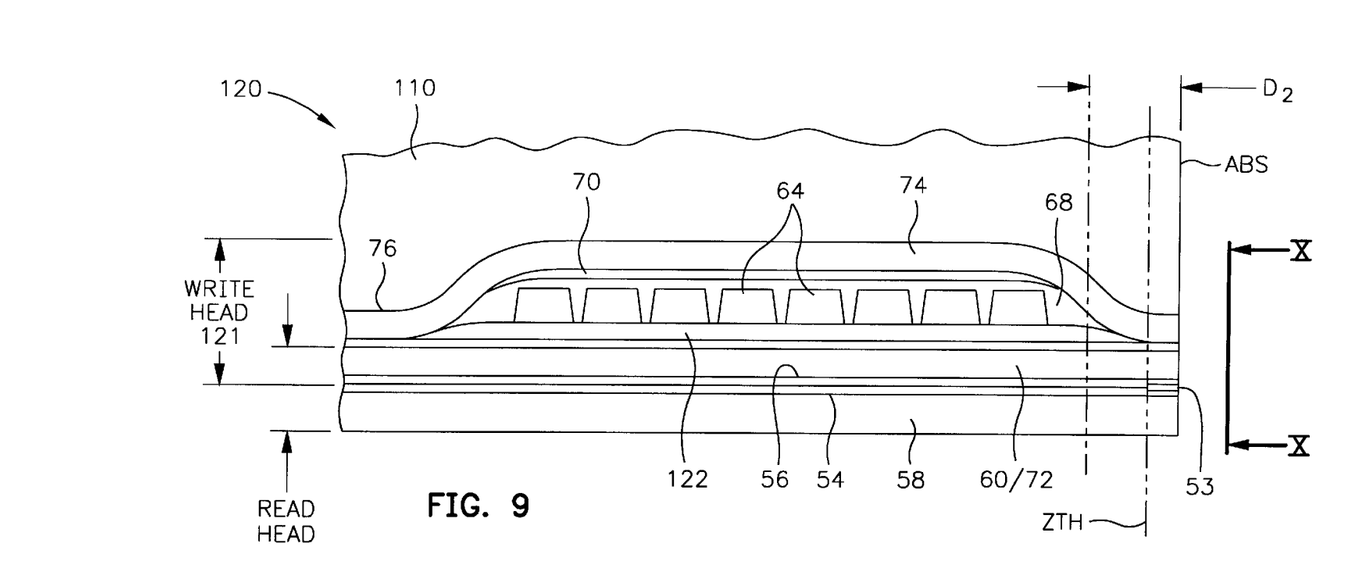
FIG. 9 is a side elevation view of the present write head taken along plane IX—IX of FIG. 2 with the overcoat layer in place.

In FIGS. 7 and 8 there is shown an overcoat layer 110 which covers the aforementioned layers of the write head. As shown in FIG. 8, the overcoat layer 110 is very shallow between the ABS and the ZTH forming a slender overcoat volume 112 which extends along the lateral expanse of the front flat edge 104 of the first insulation layer 66. The depth $D_1$ of this volume from the ABS to the ZTH is on the order of 1–2 $\mu$m. Immediately adjacent this volume is the front edge 104 of the first insulation layer 66 which is composed of photoresist. Because of the close proximity of the front edge 104 to the ABS the first insulation layer 66, as well as the second and third insulation layers, receive impact loading upon contact start and stop of the magnetic head with respect to the rotating disk. Since the photoresist material has a relatively low modulus of elasticity of 7, it is very compliant and shows a large deformation under a small stress. The overcoat layer 110 is typically constructed of a much stiffer material, such as alumina, which has a modulus of elasticity of 100. This modulus of elasticity is relatively close to the modulus of elasticity of the first and second pole pieces which is 200 for Permalloy. Another problem with the photoresist material of the insulation stack is that its coefficient of thermal expansion is 36 E-6/degree C., whereas the coefficient of thermal expansion of the alumina overcoat layer is 6 E-6/degree C. Accordingly, the photoresist insulation stack expands six times as much as the alumina overcoat layer. This expansion exerts a force at the interfaces of the alumina overcoat layer pushing it toward the ABS with a tendency to separate the overcoat layer from the second pole tip. Heat is caused by friction during contact start and stop and by the one or more coil layers and leads. Sometimes the cracks develop a step which provides a cutting edge at the ABS of the head. When this cutting edge contacts the surface of a rotating disk, layers of the head can be delaminated and/or the surface of the disk damaged. It would be desirable if the depth of the volume 112 could be recessed further into the head from the ABS, however, this would interfere with the magnetics of the head by changing the ZTH. Because of the very small volume of the overcoat layer at 112 the head develops cracks 114, particularly at the inside corners of the second pole tip, as shown in FIG. 5.

Figure 10:
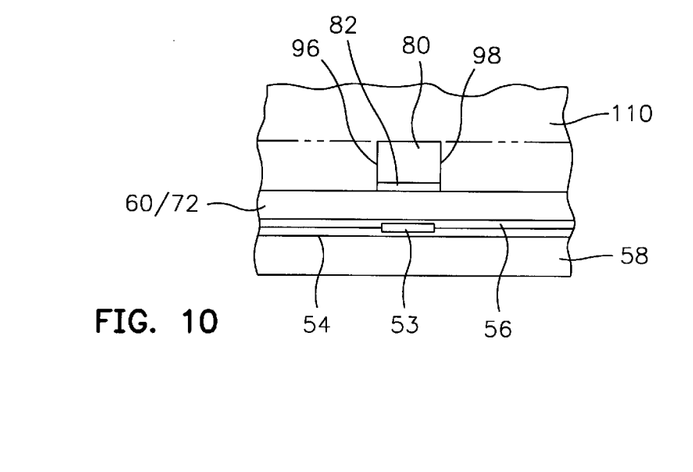
FIG. 10 is an ABS view taken perpendicular to the plane X—X of FIG. 9.
Figure 11:
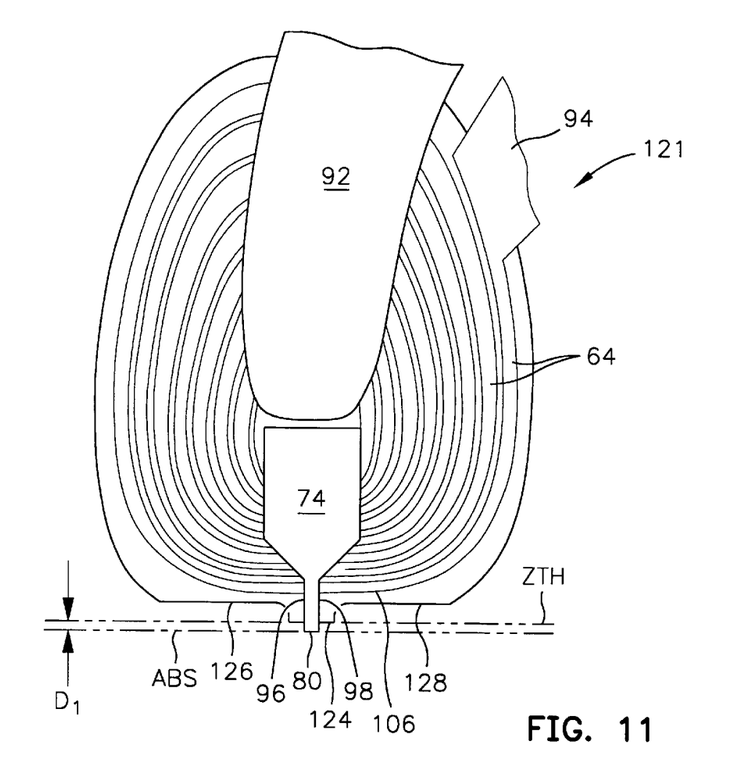
FIG. 11 is a plan view of the present write head with the overcoat layer removed.
Figure 12:
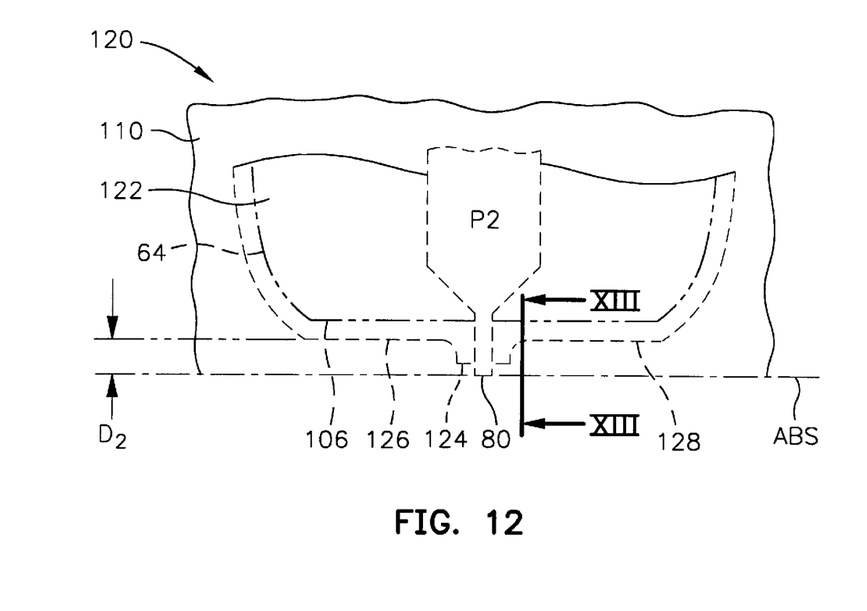
FIG. 12 is an enlarged view of a front portion of the present write head of FIG. 11 with a front portion of one of the coil layers, the insulation stack and the second pole piece shown in hidden lines under the overcoat layer.
Figure 13:
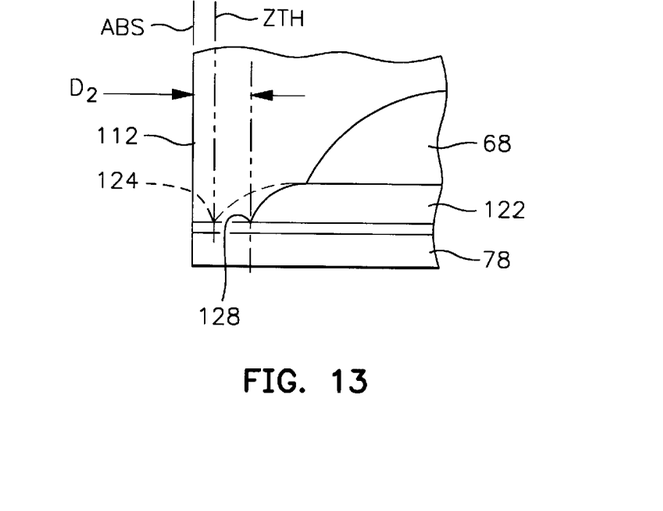
FIG. 13 is a view taken perpendicular to the plane XIII—XIII of FIG. 12.

FIGS. 9–13 show details of the present invention. The combined head 120 and its write head portion 121 are the same as the prior art except the front edge of the insulation stack and a corresponding adjacent internal edge of the overcoat layer are reconfigured so as to minimize cracking of the head at the ABS, as shown in FIG. 10. The ABS has a laterally extending width dimension which extends perpendicularly to the direction of media movement (see FIG. 1) and has a length dimension which extends parallel to the to the direction of media movement. As shown in FIGS. 11–13, the front edge of the specially reconfigured first insulation layer 122 has a central edge portion 124 and first and second lateral edge portions 126 and 128. The central edge portion 124 encompasses the second pole tip and extends laterally with respect to the ABS a short distance from both sides of the first and second walls 96 and 98 of the second pole tip, as shown in FIGS. 11 and 12. The lateral distance is preferably in the range of 6–7 $\mu$m. If the distance between the side walls of the pole tip is on the order of 2 $\mu$m, then the total length of the front edge 124 is about 12–14 $\mu$m. The first and second lateral edges 126 and 128 of the first insulation layer 122 extend laterally with respect to the ABS and parallel to the ABS in both directions from the central front edge 124. The lateral edges 126 and 128 are recessed further from the ABS than the central edge 124. It should be noted that the lateral edges 126 and 128 are substantially flat which corresponds to the flat front edge 106 of the coil layer. The extent of the recessed distance of each of the lateral edges 126 and 128 is dependent upon the recessed distance of the front edge 106 of the coil layer. The lateral edges 126 and 128 must be located between the ABS and the front edge of the coil layer so as to permit complete encapsulation of the coil layer by the insulation stack. The recessed distance $D_2$ of each of the lateral edges 126 and 128 from the ABS may be on the order of 6–7 $\mu$m. The recessed distance $D_1$ of the central edge 124 may be on the order of 1–2 $\mu$m. With this arrangement the central edge 124 defines the ZTH of the head at 1–2 $\mu$m and the lateral edges 126 and 128, which are not required to define the ZTH, are further recessed into the head. The front edge 106 of the coil layer may have a lateral expanse on the order of 80 $\mu$m. Accordingly, the central edge 124 and the lateral edges 126 and 128 preferably have a similar lateral extension of substantially 80 $\mu$m. Since the majority of the front edge of the first insulation layer 122 has been recessed further into the head, the depth of the volume of the alumina overcoat layer is increased, as shown by $D_2$ in FIG. 13. Since alumina is a better shock absorber of impact loading at the ABS cracking of the overcoat layer 110 at the ABS is substantially eliminated, as shown in FIG. 10.

Figure 14:
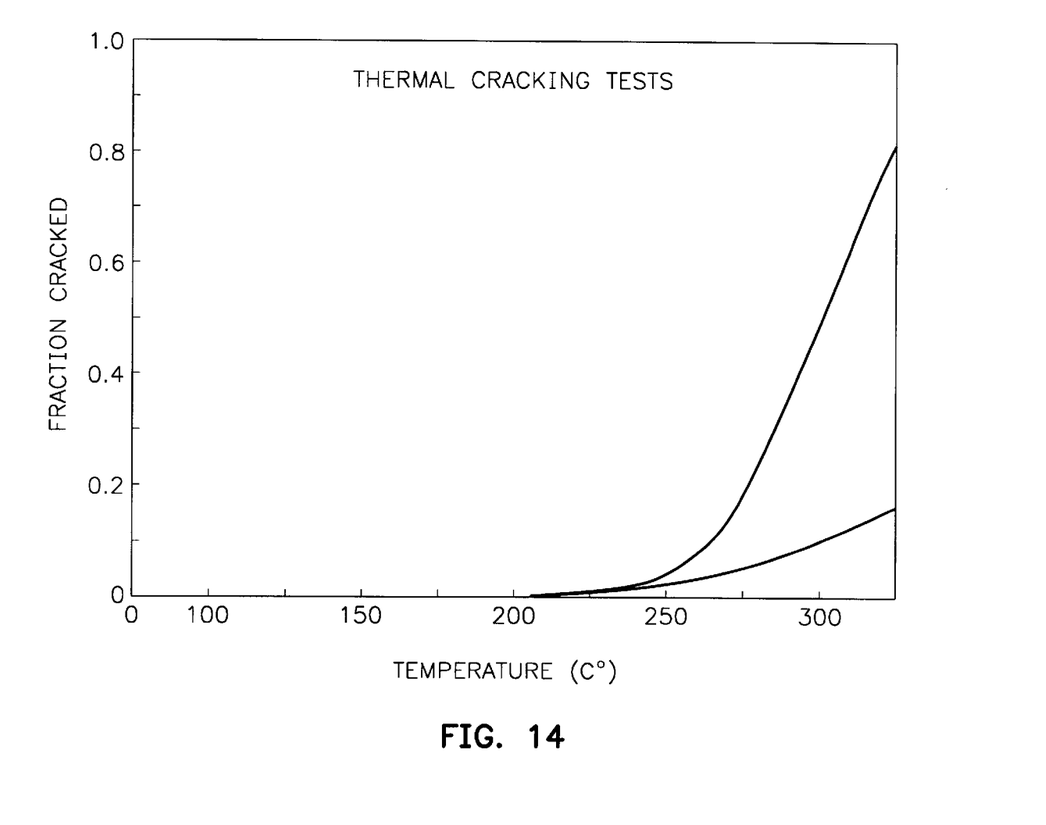
FIG. 14 is a chart showing the results of experiments comparing prior art write heads (dashed line) with the present write heads (continuous line).

FIG. 14 is a graph showing results of testing write heads with prior art ZTH-defining insulation layers as compared to the present invention which reconfigures the front edge of the ZTH-defining insulation layer to accommodate additional alumina of the overcoat layer. It can be seen that at 300° C., cracking of the head at the ABS is five times more likely with the prior art head (dashed line) as compared to the present write head (continuous line).

Figure 15:
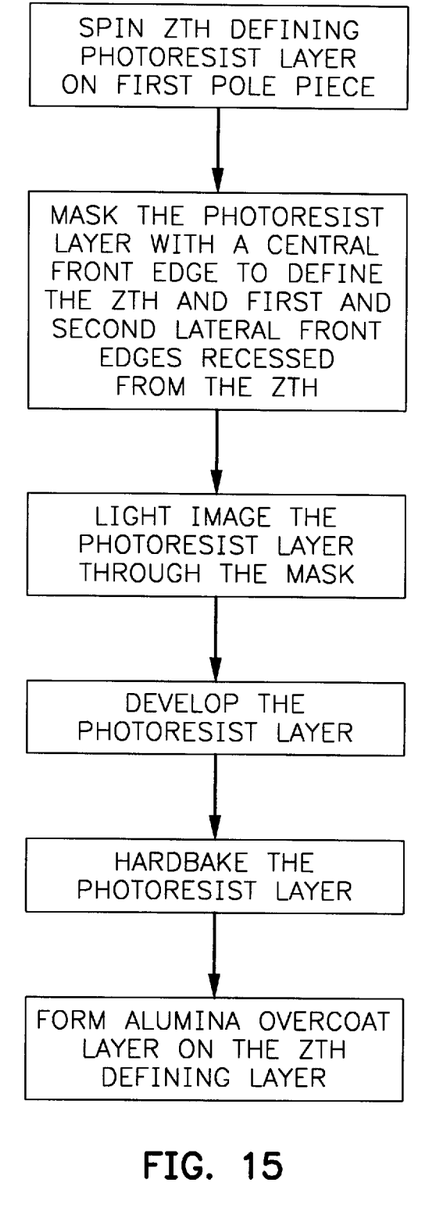
FIG. 15 is a series of steps involved in making the present invention.

A method of making the present inductive write head is shown in FIG. 15. The ZTH-defining photoresist layer is spun on the first pole piece. The photoresist layer is then masked with a mask which has a central front edge to define the ZTH and first and second lateral front edges which are recessed from the ZTH. Light is then imaged through the mask onto the photoresist layer, after which the photoresist layer is developed and hard-baked. After forming the other insulation layers, the overcoat layer is formed on the ZTH-defining insulation layer providing an increased volume of the overcoat layer adjacent the ABS for minimizing cracking of the head at the ABS.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A thin film magnetic write head with an air bearing surface (ABS) at an end of the head, the ABS having a laterally extending width dimension which extends perpendicularly to a direction of media movement and a length dimension which extends parallel to said direction of media movement, the write head comprising:

a coil layer and an insulation stack, the coil layer being embedded in the insulation stack;

the coil layer having a laterally extending substantially flat front edge which is recessed from and substantially parallel to the ABS;

first and second pole pieces;

the insulation stack being sandwiched between the first and second pole pieces;

a gap layer;

the first and second pole pieces being magnetically connected at a back gap and having first and second pole tips respectively which are separated by the gap layer at the ABS;

an overcoat layer covering the coil layer, the insulation stack, the first and second pole pieces and the gap layer;

the first and second pole tips, the gap layer and the overcoat layer having forward surfaces which form a portion of the ABS;

the insulation stack having a laterally extending, centrally located neck portion disposed between the first and second pole tips, the neck portion having a forwardly located, laterally extending central edge recessed from the ABS and defining a zero throat height;

the insulation stack further having first and second laterally extending lateral edges on each side of the central edge;

said lateral edges being recessed further from the ABS than said central edge;

said central edge and said first and second lateral edges of the insulation stack being substantially parallel to the ABS and located between the front edge of the coil layer and said ABS, and the overcoat layer having recessed edges which interface said central edge and said first and second lateral edges of the insulation stack.

2. A combined head including the write head of claim 1, the combined head including:

a magnetoresistive (MR) stripe and first and second gap layers;

the MR stripe being sandwiched between the first and second gap layers;

first and second shield layers; and the first and second gap layers being sandwiched between the first and second shield layers.

3. A magnetic disk drive including the head as claimed in claim 2, the drive comprising:

a frame;

a magnetic disk rotatably supported on the frame;

a support mounted on the frame for supporting the combined head in a transducing relationship with the magnetic disk;

means for rotating the magnetic disk;

positioning means connected to the support for moving the combined head to multiple positions with respect to said magnetic disk; and means connected to the head, to the means for rotating the magnetic disk and to the positioning means for exchanging signals with the combined head, for controlling movement of the magnetic disk and for controlling the position of the combined head.

4. A write head as claimed in claim 1 wherein the insulation stack is composed of photoresist and the overcoat layer is composed of alumina.

5. A write head as claimed in claim 1, including:

the second pole tip having first and second side walls which are substantially perpendicular to the ABS and which are laterally spaced to define a track width of the write head;

said central edge of the insulation stack extending laterally beyond each of said first and second side walls of the second pole tip.

6. A write head as claimed in claim 5 wherein said central edge extends laterally substantially 12–14 $\mu$m.

7. A write head as claimed in claim 1 wherein said lateral edges are recessed substantially 6–7 $\mu$m.

8. A write head as claimed in claim 1, including:

the insulation stack having first, second and third insulation layers;

the first insulation layer being located on the first pole piece, the coil layer being located on the first insulation layer, the second insulation layer being located on the core layer and the third insulation layer being located on the second insulation layer; and one of the insulation layers having said central edge to define said zero throat height.

9. A write head as claimed in claim 8 wherein said one of the insulation layers is the first insulation layer.

10. A write head as claimed in claim 1 wherein the central edge and the first and second lateral edges of the insulation stack have a combined length which is substantially equal to a length of the front edge of the coil layer.

11. A write head as claimed in claim 10 wherein the insulation stack is composed of photoresist and the overcoat layer is composed of alumina.

12. A write head as claimed in claim 11, including:

the second pole tip having first and second side walls which are substantially perpendicular to the ABS and which are laterally spaced to define a track width of the write head; and said central edge of the insulation stack extending laterally beyond each of said first and second side walls of the second pole tip.

13. A combined head including the write head of claim 12, the combined head including:

a magnetoresistive (MR) stripe and first and second gap layers;

the MR stripe being sandwiched between the first and second gap layers;

first and second shield layers; and the first and second gap layers being sandwiched between the first and second shield layers.

14. A magnetic disk drive including the head as claimed in claim 13, the drive comprising:

a frame;

a magnetic disk rotatably supported on the frame;

a support mounted on the frame for supporting the combined head in a transducing relationship with the magnetic disk;

means for rotating the magnetic disk;

positioning means connected to the support for moving the combined head to multiple positions with respect to said magnetic disk; and means connected to the head, to the means for rotating the magnetic disk and to the positioning means for exchanging signals with the combined head, for controlling movement of the magnetic disk and for controlling the position of the combined head.

15. A write head as claimed in claim 14, including:

the insulation stack including first, second and third insulation layers;

the first insulation layer being located on the first pole piece, the coil layer being located on the first insulation layer, the second insulation layer being located on the core layer and the third insulation layer being located on the second insulation layer; and one of the insulation layers having said central edge to define said zero throat height.

16. A write head as claimed in claim 16 wherein said one of the insulation layers is the first insulation layer.

17. A write head as claimed in claim 16 wherein said lateral edges are recessed substantially 6–7 $\mu$m.

18. A write head as claimed in claim 17 wherein said central edge extends laterally substantially 12–14 $\mu$m.

19. A combined head including the write head of claim 18, the combined head including:

a magnetoresistive (MR) stripe and first and second gap layers;

the MR stripe being sandwiched between the first and second gap layers;

first and second shield layers; and the first and second gap layers being sandwiched between the first and second shield layers.

20. A magnetic disk drive including the head as claimed in claim 19, the drive comprising:

a frame;

a magnetic disk rotatably supported on the frame;

a support mounted on the frame for supporting the combined head in a transducing relationship with the magnetic disk;

means for rotating the magnetic disk;

positioning means connected to the support for moving the combined head to multiple positions with respect to said magnetic disk; and means connected to the head, to the means for rotating the magnetic disk and to the positioning means for exchanging signals with the combined head, for controlling movement of the magnetic disk and for controlling the position of the combined head.

* * * * *